United States Patent [19]

Roseliep

[11] Patent Number: 4,917,551
[45] Date of Patent: Apr. 17, 1990

[54] PROGRESSIVE BLIND SPLINE BROACH MACHINE AND METHOD

[76] Inventor: Robert E. Roseliep, 6 Elmsleigh La., Grosse Pointe, Mich. 48230

[21] Appl. No.: 244,010

[22] Filed: Sep. 14, 1988

[51] Int. Cl.$^4$ .................................................. B23D 37/08
[52] U.S. Cl. .................................... 409/244; 409/251; 409/263; 409/273
[58] Field of Search ............... 409/244, 251, 257, 263, 409/269, 273, 268, 270

[56] References Cited

U.S. PATENT DOCUMENTS

| | | | |
|---|---|---|---|
| 1,627,755 | 5/1927 | Urschel | 409/269 X |
| 2,280,229 | 4/1942 | Groene et al. | 90/33 |
| 2,307,228 | 1/1943 | Monroe | 409/273 X |
| 2,365,040 | 12/1944 | Averill et al. | 409/251 |
| 4,193,722 | 3/1980 | Bishop | 409/59 |
| 4,432,130 | 2/1984 | Gabriele | 29/563 |

FOREIGN PATENT DOCUMENTS

| | | | |
|---|---|---|---|
| 0613877 | 6/1978 | U.S.S.R. | 409/263 |
| 0732091 | 5/1980 | U.S.S.R. | 409/268 |

*Primary Examiner*—Z. R. Bilinsky
*Attorney, Agent, or Firm*—Barnes, Kisselle, Raisch, Choate, Whittemore & Hulbert

[57] ABSTRACT

A method and apparatus for progressive machining of blind spline workpieces which includes step-by-step moving of work holding stations on an indexing table with loading and unloading stations located adjacent the table between work stations. Axially in line with the work stations between indexes are multiple tool rams hydraulically powered to drive a broaching tool over or into workpieces to achieve progressive broaching as the work is indexed. The rams can be simultaneously activated or sequentially activated depending on the capacity of the hydraulic system.

6 Claims, 6 Drawing Sheets

PROGRESSIVE BLIND SPLINE BROACH MACHINE AND METHOD

FIELD OF INVENTION

Machine for progressively broaching blind splines in a step-by-step operation.

BACKGROUND OF AND FEATURES OF THE INVENTION

This invention relates to a method and apparatus for broaching elongate work parts and especially to what is termed "blind spline" broaching utilizing multiple broaching rams in the same machine with cutting tools mounted on the rams and having work parts mounted in work holding devices indexed below the rams, rotationally or longitudinally for broaching in a series of passes. U.S. Pat. No. 4,401,406 to Roseliep (1983) discloses a method and apparatus for blind spline broaching.

In previous machines the parts have been mounted in work holding devices attached to rams and the cutting tools mounted to an indexing unit below the work holding rams for the insertion and withdraw of the part. These machines have utilized one or two rams per machine.

The invention to be described is designed to materially improve production. That is, piece output per hour, and incorporates simplified loading and unloading which contributes to the increased productivity. For example, a part requiring six cuts to complete the part in a conventional machine has required almost 30 seconds for a total cycle whereas it is intended that the machine to be described will require less than 5 seconds for a total cycle regardless of the number of cuts.

A patent to Groene et al, U.S. Pat. No. 2,280,229 (1942) shows indexing crankshafts for combination broaching and shaving operation at various indexing stations. U.S. Pat. No. 4,432,130 to Gabriele (1984) illustrates machining sequentially parallel surfaces in workpieces mounted on an indexing table. A patent to Bishop, U.S. Pat. No. 4,193,722, illustrates an in-line operation with spaced apart broach blades.

The present invention to be disclosed utilizes an indexing table having a number of work holding stations which are mounted on a base circle and with spacing equal to the broaching rams described below. While the table may be lineal, it will be described in the present disclosure as a rotatable indexing table. Above the indexing table in positions to register with the work holding stations are broaching rams each holding a broaching tool. These tools will take progressive cuts as described in the above referenced Roseliep patent. The broach tool rams can be power actuated simultaneously, or, in a more economical machine, sequentially.

The indexing of the workpieces with an individual workpiece loading station and a separate unloading station together with the progressive cuts in the blind spline operation allows rapid handling of parts and an extremely efficient and accurate processing of parts in an otherwise difficult machining function.

While the process and apparatus to be described has particular reference to the blind spline cutting, it may also be used in forming similar shapes such as cams or irregular profiles.

Other objects and features of the invention will be apparent in the following description and claims in which the principles of the invention are set forth together with details to enable persons skilled in the art to practice the invention all in connection with the best mode presently contemplated for the invention.

BRIEF DESCRIPTION OF THE DRAWINGS

DRAWINGS accompany the disclosure and the various views thereof may be briefly described as.

DETAILED DESCRIPTION OF THE INVENTION AND THE MANNER AND PROCESS OF USING IT

Figure 1:
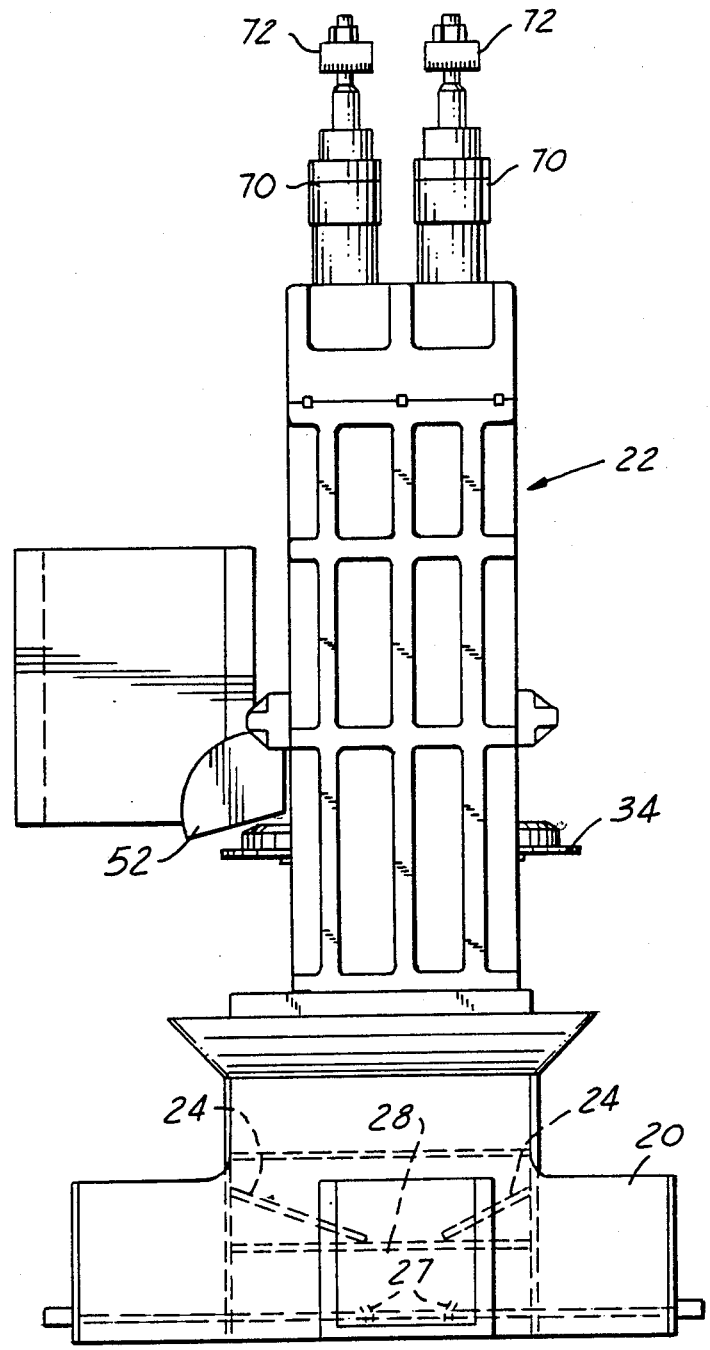
FIG. 1, an end view of the machine for blind spline broaching.
Figure 2:
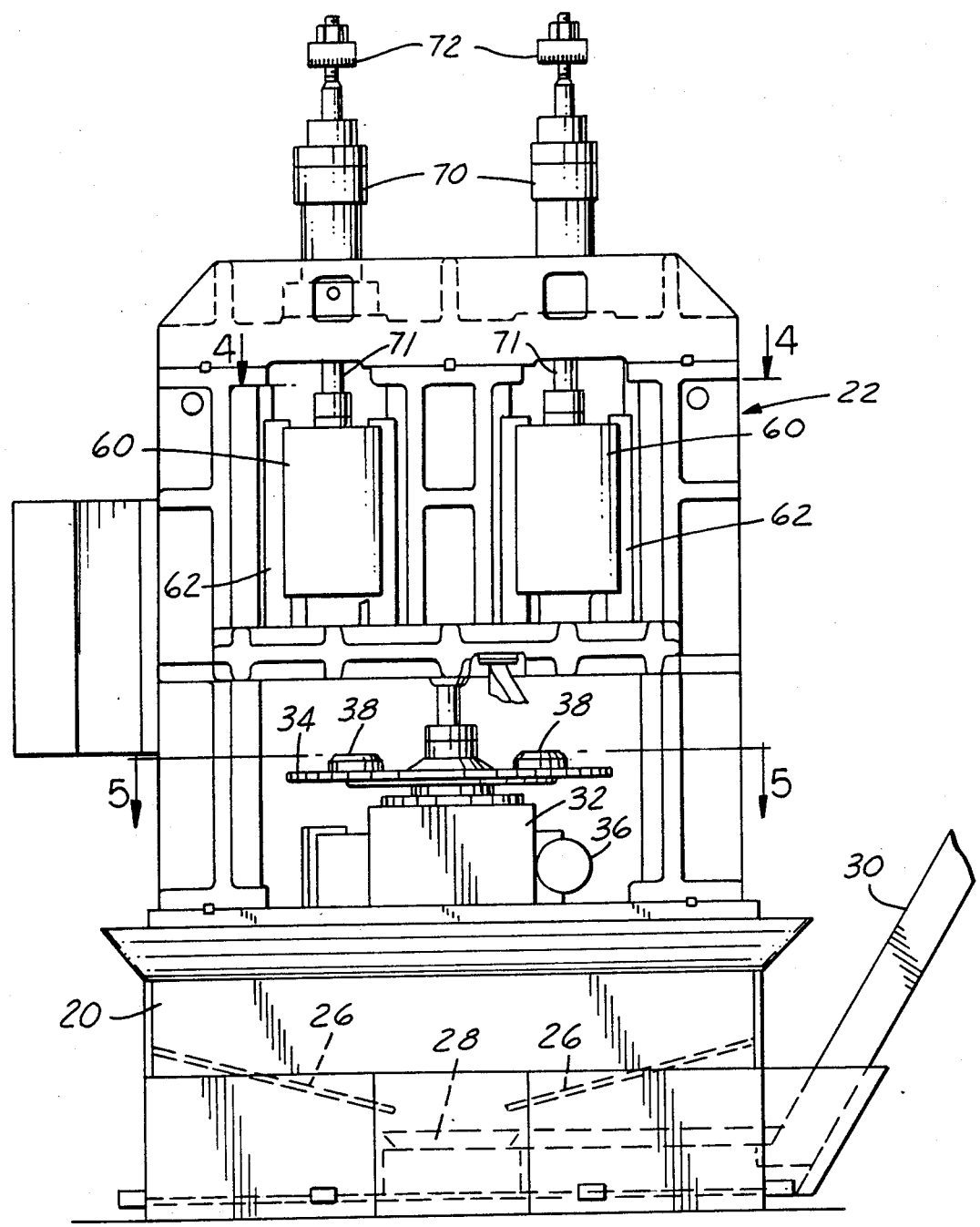
FIG. 2, a side view of the machine showing the index table and the tool rams.

With reference to FIG. 1, which is an end view of the broaching machine, a base 20 supports a machine frame 22. These parts are also shown in the side view of FIG. 2. In dotted lines in the base are coolant and chip directing plates 24 and 26 which lead to a collector 28 frame from which a conveyor, shown diagrammatically at 30, can retrieve the chips.

Optionally, a hole 27 through the bottom of frame 22 can be used to adapt the machine to a central coolant system.

Figure 5:
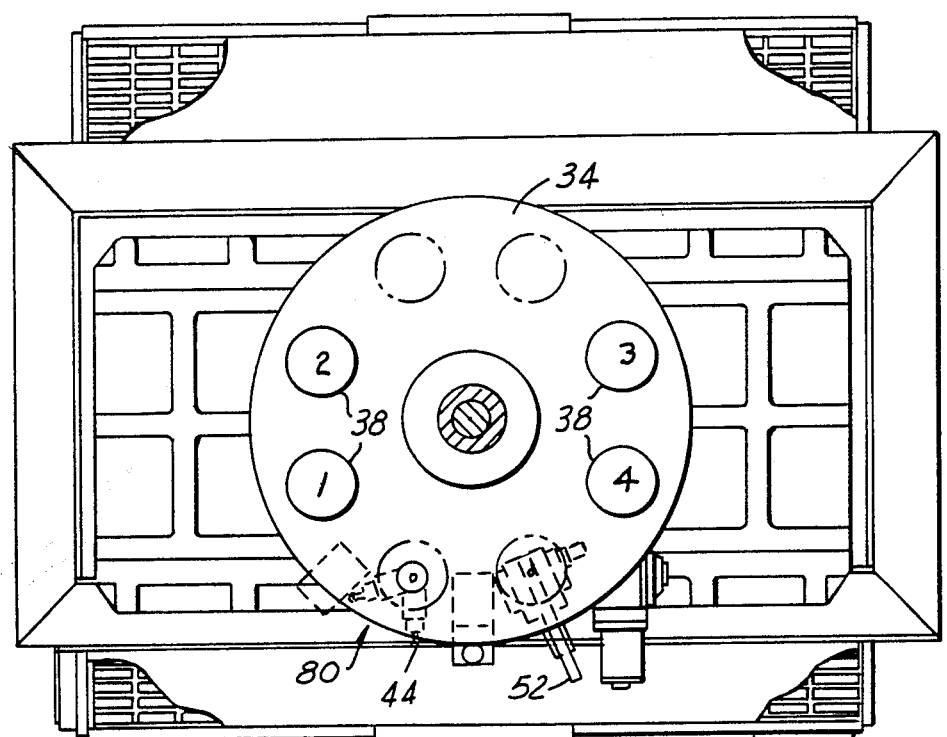
FIG. 5, a sectional view of line 5—5 of FIG. 2.
Figure 6:
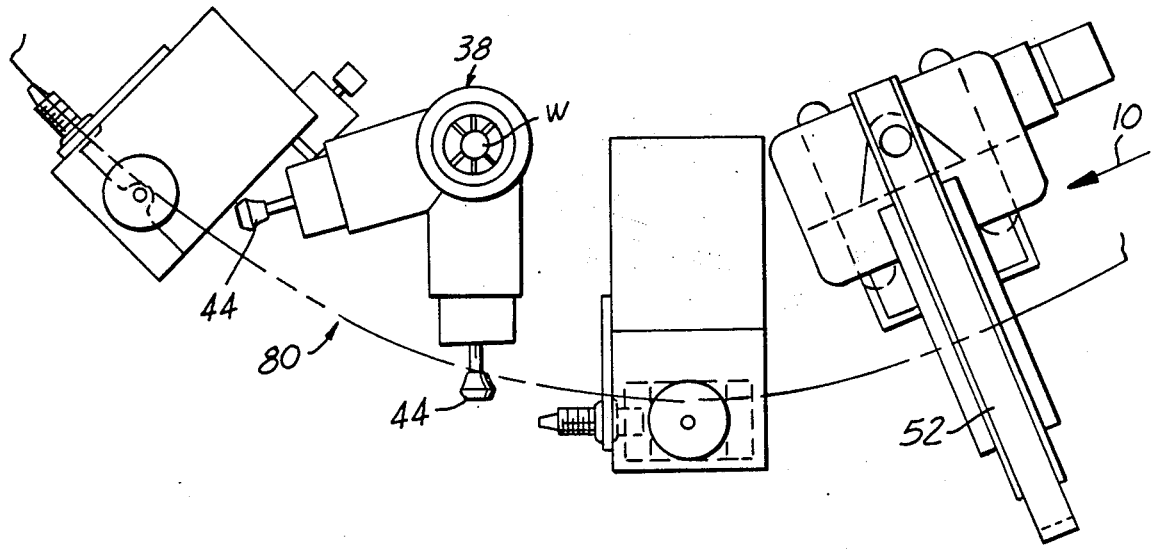
FIG. 6, a fragmentary view of the load and unload stations at the indexing table.
Figure 8:
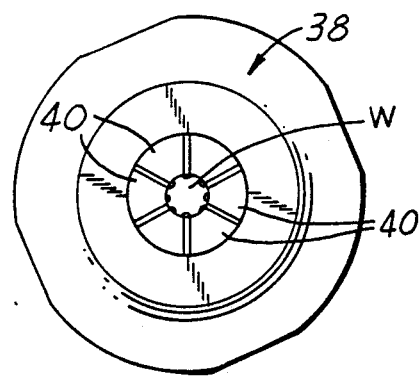
FIG. 8, a sectional view of line 8—8 of FIG. 7.
Figure 7:
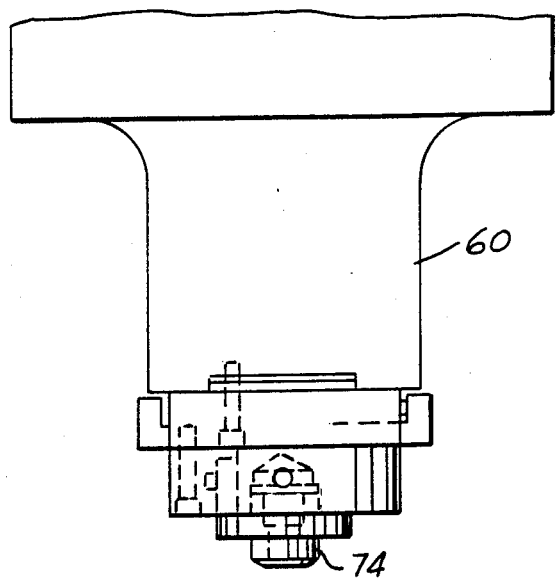
FIG. 7, a partial section showing the work load station.
Figure 7:
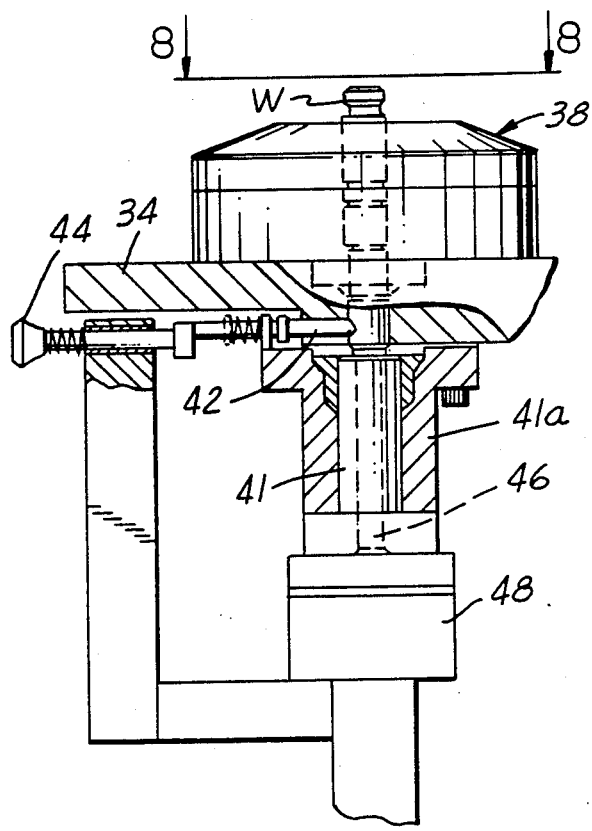

Mounted on a power base 32 (FIG. 2) is an indexing table 34 appropriately driven in a step-by-step operation by a conventional index drive in power base 32 powered by a motor 36. Four or more work part holders 38 are arranged on the table 34 as shown in FIG. 5. Four circled work stations numbered 1, 2, 3 and 4 are shown in FIG. 5 but the dotted circles indicate additional locations for four more work stations. In any case, the work stations will be oriented on the table 34 to register axially with tool rams to be described. In FIGS. 7 and 8 the work part holders are shown in greater detail. A workpiece W is retained by releasable radial jaws 40 which are suitably clamped in a conventional way in the holder 38. The workpiece W seats on a locator 41 in a collar 41a, and pins 42 may be provided (FIG. 5) resiliently biased, to position the part in proper radial orientation prior to the clamping of the jaws 40. Pull plungers 44 will, when retracted, allow insertion of the workpiece at a load station. The locator 41 has a central recess containing an axially movable ejector pin 46 which is power actuated by a piston-cylinder motor 48 at the unload station to release the workpiece.

Figures 10, 11, 12:
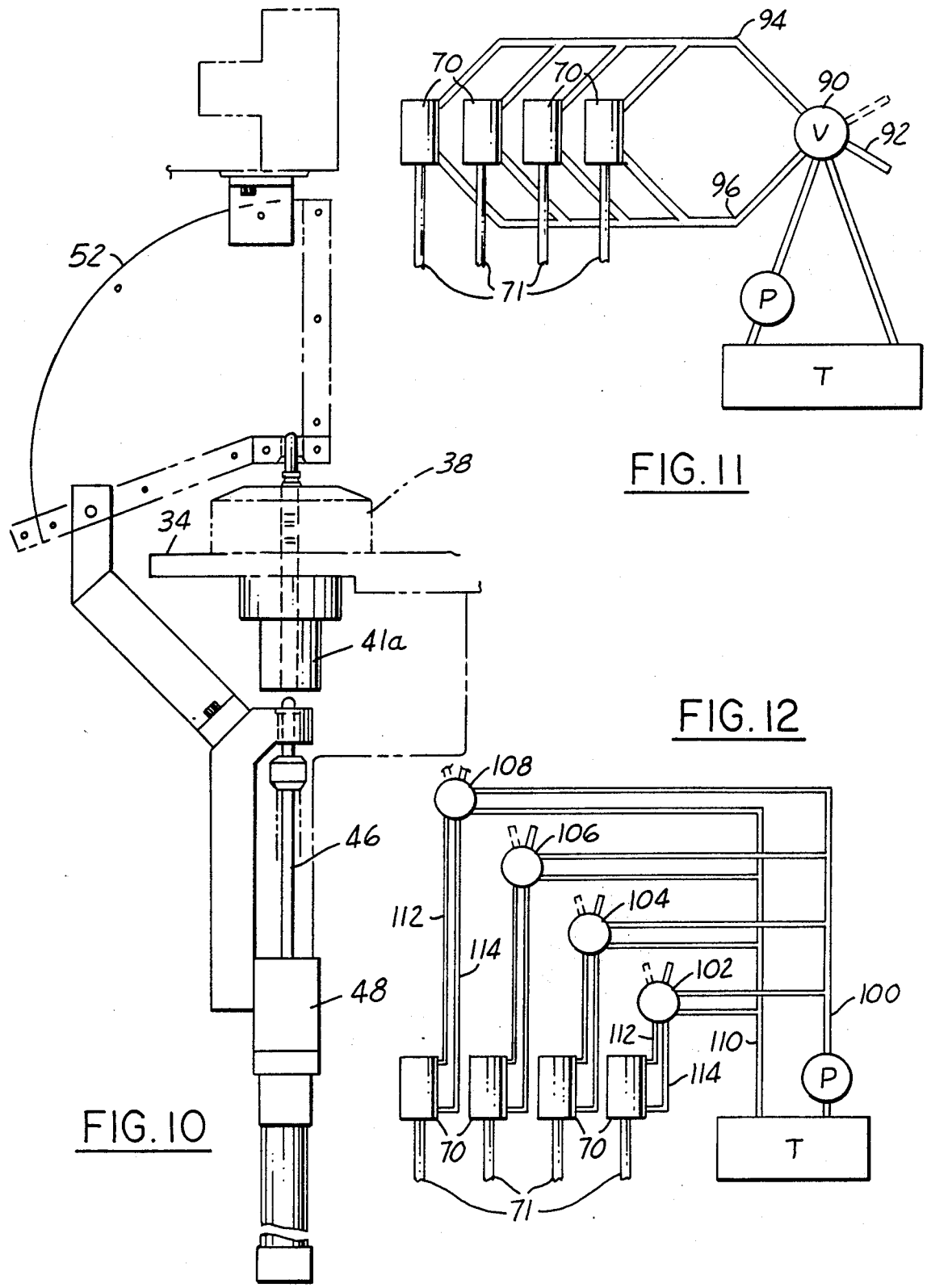
FIG. 10, a side view of the work unload elements.
FIG. 11, a hydraulic power circuit for simultaneous operation of the ram cylinders.
FIG. 12, a hydraulic power circuit for individual and sequential operation of the ram cylinders.

In FIG. 10, the unloading mechanism is illustrated diagrammatically showing the cylinder 48 for operating the ejector pin 46 which moves the workpiece into a chute 52 for suitable discharge to a collector bin. A part retractor operating above the holders 38 may also be used.

Figure 4:
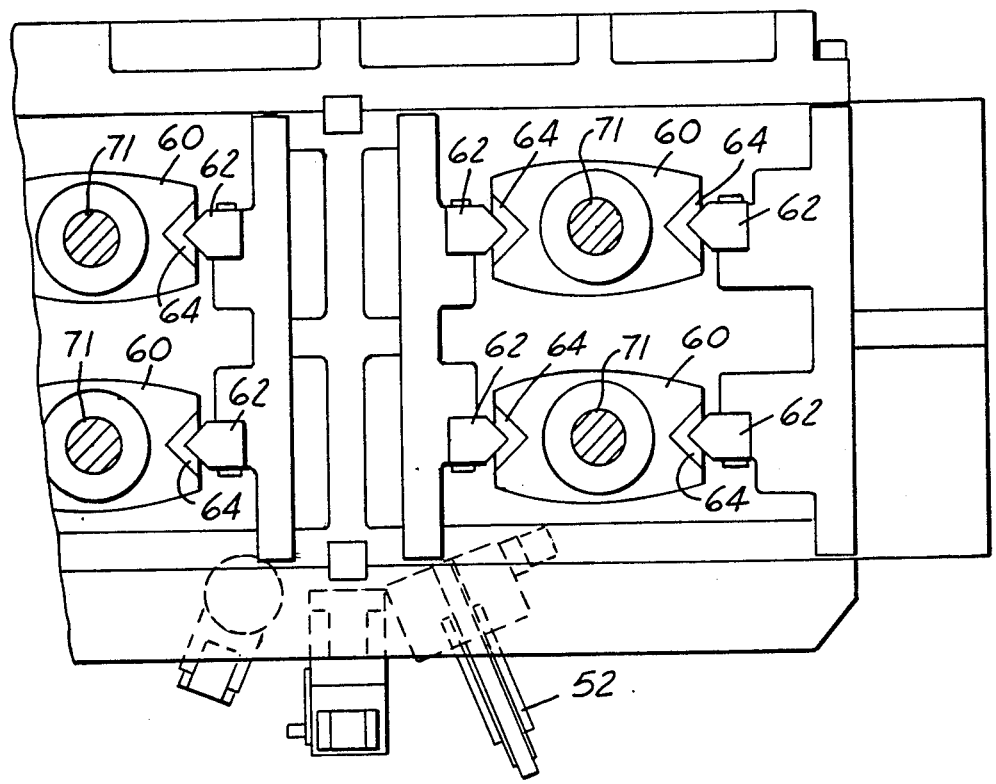
FIG. 4, a sectional view of line 4—4 of FIG. 2.
Figure 9:
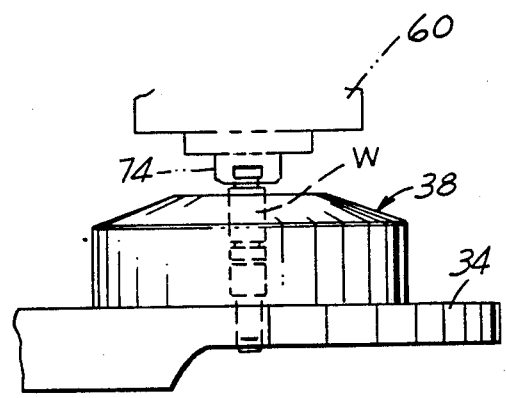
FIG. 9, a view of the work holder and tool rams in raised and working positions.

On the upper portion of the frame 22 (FIGS. 2 and 4) are four tool ram slides 60. V-shaped guides 62 cooperate with suitable V-shaped bushings 64 in the slides 60. The ram slides 60 are each powered by a piston-cylinder combination 70 extending above the frame 22. Piston rods 71 connect the piston to the ram slides. Each has a micrometer adjustment 72 to regulate the stroke. In FIG. 9 the slide or tool head 60 is shown in greater detail carrying a blind-spline tool collar 74.

The tool ram slides 60 and the work holder stations are arranged to register upon proper indexing of table 34 so that different tool collars 74 can each perform a spline cut on a workpiece W as the slides 60 are moved vertically down over the retained workpieces.

Figure 3:
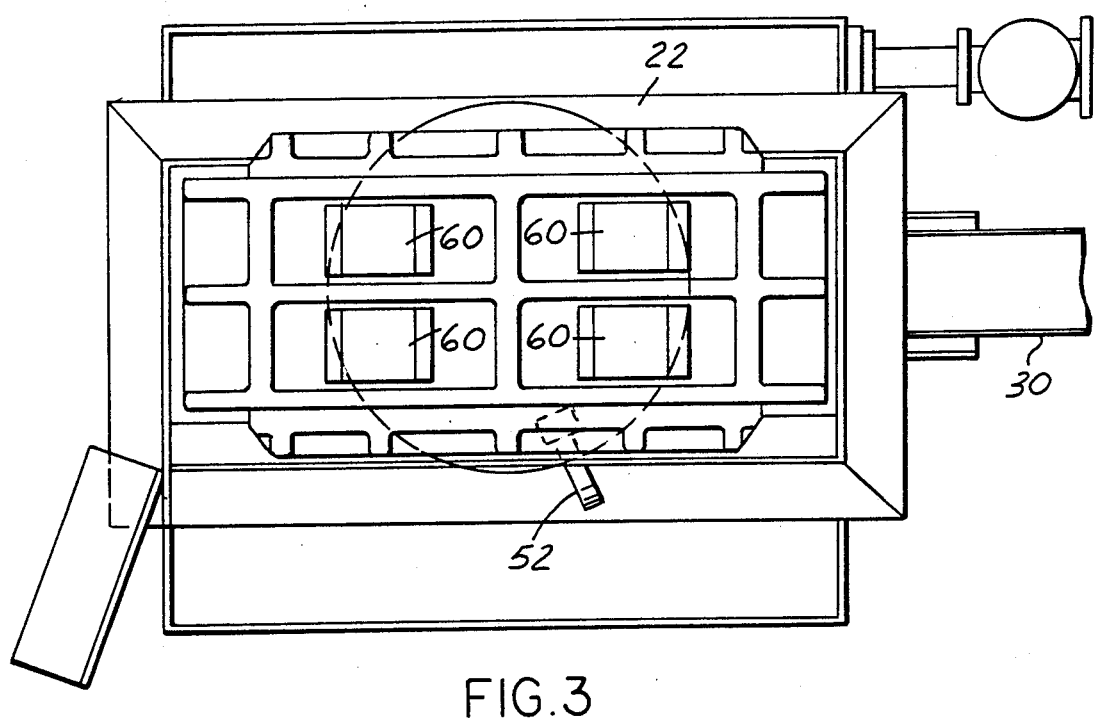
FIG. 3, a diagrammatic view showing the relationship of the tool rams and the work table.

Adjacent the unloading station and independent of the index table 38 (FIGS. 3 and 5) is a load station 80. A workpiece W is dropped into the jaws 40 while in retracted position and the jaws are moved to clamp position.

In the operation of the device, each index of the table 34 moves a station on work-holder 38 to a load and unload position. Accordingly, unloading can be accomplished automatically upon retraction of the holding jaws by ejection of the the part to chute 52. At the same time a part can be loaded at the load station. Also as each work station 38 moves under a tool ram the piston-cylinder combination can be actuated to drive the spline tool collar down over the part to take progressive cuts as the part moves from station to station. After four cuts, in this particular modification, the blind spline is completed, the part ejected and a new part starts in the rotational cycle.

As indicated earlier in the specification, the tool slides can be operated individually in sequence or simultaneously. Sequential operation requires less hydraulic pump capacity and is more economical than if all the rams are operated simultaneously. The time loss may be significant and would usually be the criteria by which the more expensive (simultaneous) operation is chosen.

In FIG. 11, a diagrammatic hydraulic circuit is illustrated for simultaneous operation of the tool ram cylinders 70. A pump P delivers pressure fluid from tank T to a valve 90 having an operating lever 92 which can be manually or solenoid operated. A pressure line 94 delivers pressure fluid simultaneously to the respective cylinders 70 when the valve 90 is actuated to force the rams down and cause the spline tools to perform respective cuts on a workpiece. Shifting of lever 92 will direct pressure to line 96 to raise the rams to permit indexing of the table 34.

In FIG. 12, a modified diagrammatic circuit is illustrated for sequential operation of the tool ram cylinders 70. A pump P delivers pressure fluid from a tank T to a line 100 leading to respective valves 102, 104, 106 and 108, each associated with a ram cylinder 70. Each valve is also connected to the tank T through a line 110. Pressure lines 112 and 114 will furnish pressure fluid selectively to the respective ends of the cylinders 70, depending on the valve position, to lift or lower the ram pistons in cylinders 70. With this circuit, a smaller and less expensive hydraulic pump and system can be utilized. Each valve has an operating lever and solenoid or other equivalent means can be used to actuate the levers sequentially so that each ram can be actuated to perform the spline cut at a work station. Reversing of the levers will effect sequential retraction of the rams.

What is claimed is:

1. A method of progressively broaching blind splines or similar shapes such as cams or irregular profiles or multiple workpieces which comprises:
   (a) providing an indexable work table having a plurality of work holding stations arranged in predetermined spacing along an indexing path,
   (b) providing a work loading station and a work unloading station in the indexing path at adjacent locations between said work holding stations,
   (c) providing a plurality of axially movable, non-rotating, reversible tool rams in stationary positions above the indexing path, each tool ram spaced to register with respective work holding stations,
   (d) providing a plurality of individual reversible, piston-cylinder, non-rotating drives each coupled to a tool ram and connected to a fluid pressure source,
   (e) indexing the work table in a step-by-step motion,
   (f) loading a workpiece at a work loading station in each work holding station as the table is indexed,
   (g) unloading a workpiece at the work unloading station as the table is indexed,
   (h) mounting a cutting tool on each tool ram, and
   (i) actuating each piston-cylinder drive to move each ram and cutting tool toward a workpiece in a work station to accomplish metal removal between indexing steps,
      whereby a metal removal cut is performed on each workpiece at each work holding station between indexes and a plurality of metal removing cuts are performed by each tool ram between indexes.

2. A method as defined in claim 1 in which said metal removal cuts are performed by operating said non-rotating piston-cylinder drives simultaneously to move said tool rams simultaneously between indexes.

3. A method as defined in claim 1 in which said metal removal cuts are performed by operating said non-rotating piston-cylinder drives individually and sequentially to move said tool rams sequentially between indexes.

4. A machine for progressively broaching blind splines or similar shapes such as cams or irregular profiles on multiple workpieces which comprises:
   (a) a base,
   (b) a stationary frame mounted on and above said base,
   (c) a plurality of stationary fluid operated tool reversible cam cylinders on said frame spaced above said base and oriented parallel to and around a center axis,
   (d) an axially movable tool ram in each cylinder movable in said frame toward said base,
   (e) means on said rams to carry a broaching tool,
   (f) an indexing table on said base movable around said center axis in a step-by-step motion,
   (g) means on said indexing table to carry a plurality of workpieces in circumferentially spaced relation corresponding to the spacing of said tool ram cylinders, and
   (h) fluid control means associated with each reversible ram cylinder to actuate each said tool ram and a broaching tool associated therewith to and from a workpiece on said indexing table between indexing steps.

5. A machine as defined in claim 4 in which each said machine tool ram has opposed V-shaped grooves, and said machine has opposed V-shaped guides interfitted with said grooves to provide accurate axial motion of said rams in the direction of a workpiece.

6. A machine as defined in claim 5 in which said V-shaped grooves are lined with a V-shaped slide bearing to interfit with said opposed guides.

* * * * *